United States Patent Office

3,515,643
Patented June 2, 1970

3,515,643
PROCESS FOR THE PRODUCTION OF LYSOZYME
Giuseppe Ghielmetti and Carlo Trinchera, Milan, Italy, assignors to SPA—Societa Prodotti Antibiotici S.p.A., Milan, Italy
No Drawing. Filed Feb. 17, 1967, Ser. No. 616,784
Claims priority, application Great Britain, Feb. 28, 1966, 8,675/66
Int. Cl. C07g 7/026; A61k 19/00
U.S. Cl. 195—66      5 Claims

ABSTRACT OF THE DISCLOSURE

A method of producing lysozyme from egg white in which the egg white is contacted with a weakly acidic ion exchange resin, and this resin then eluted, first to remove contaminating proteins and thereafter to remove the lysozyme.

BACKGROUND OF THE INVENTION

Lysozyme, which was first reported by Fleming in 1922, is an enzyme with inhibiting and lytic properties over certain bacteria, such as *Micrococcus lysodeikticus*, and other gram-positive and gram-negative bacteria. Lysozyme has been found in a large number of animal fluids, such as tears, pleural fluid, saliva, human milk and blood serum, as well as in a great variety of organs, such as kidneys and lungs, a very high content having been found in egg white.

Lysozyme is well known as an effective immunological agent and has been called an "endogenous antibiotic." Due to this characteristic, is is widely used in human therapy for the treatment of viral and bacterial infections. Other important therapeutic uses of lysozyme have also been reported recently. Thus it has been shown that it has an outstanding analgesic effect when administered to patients suffering from cancer and has also been used as a potentiating agent in antibiotic therapy. It has also been used in the prophylaxis and therapy of leukopenia induced by antiblastics and ionising radiations.

In view of the ever increasing use of lysozyme, it is clearly desirable to have available a method of production which gives higher yields than the methods previously used and which gives a product with a high degree of activity and purity which is essential for parenteral administration.

Lysozyme is known to be present in egg white in an amount of about 0.5% by weight, together with numerous other high molecular weight proteins which, if administered parenterally, could produce an antibody reaction.

In one known method of producing lysozyme from egg white, the egg white is mixed with a sufficient amount of an inorganic salt to cause crystallisation of the lysozyme. A disadvantage of this method is that various other proteinaceous materials are entrained with the lysozyme which is, therefore, of limited use or which requires further purification and this increases the overall cost of the lysozyme. Furthermore, the separation of the lysozyme from the egg white is incomplete.

In other known methods for the purification of lysozyme, egg white is diluted considerably with water or buffer solutions and the lysozyme removed therefrom by adsorption or various materials. Alternatively, egg white is mixed with dilute aqueous slurries or suspensions of various adsorbants, whereby the lysozyme is removed.

A great disadvantage of all of the previously used methods for the production of lysozyme from egg white is that the egg white remaining after the lysozyme has been removed is either of very limited use or is of no use whatsoever. This obviously increases the overall cost of the processes.

Finally, it is also known that investigations have been carried out on lysozyme preparations prepared by the previously known methods of production in which dilute aqueous solutions of lysozyme have been chromatographed on various ion exchangers.

SUMMARY OF THE INVENTION

It is an object of the present invention to provide a process for the production of lysozyme from egg white which is simpler to carry out than the previously known methods, provides a very pure material suitable for parenteral administration and also permits the egg white, minus the lysozyme, to be recovered and used for a wide variety of other purposes, especially as a foodstuff.

During the course of experiments which we have carried out for the production of lysozyme on a large scale from egg white, we have observed, surprisingly, that when egg white per se, i.e. without dilution with water or a buffer solution, is kept in contact with a weakly acidic ion exchange resin, the lysozyme is completely and selectively adsorbed.

Thus, according to the present invention, there is provided a process for the production of lysozyme from egg white, wherein egg white is contacted with a weakly acidic ion exchange resin at a pH of 6–7, preferably of 6.4–6.5, at a temperature below room temperature, i.e. below about 25° C., preferably at 0–5° C., separating the resin, eluting contaminating proteins from the resin with a salt solution having a concentration of not more than 0.2 M and a pH of not more than 7, preferably of 6.2–6.8, then eluting the lysozyme with an aqueous solution of a salt and precipitating the lysozyme from the eluate by increasing the salt concentration therein.

DETAILED DESCRIPTION OF THE INVENTION

It is to be understood that the end of the elution of contaminating proteins can be ascertained by determination of the ultraviolet adsorption and the commencement of the elution of lysozyme can be detected microbiologically with, for example, *Micrococcus lysodeikticus*.

If desired, there may be added to the egg white, volatile compounds which inhibit fermentation, such as chloroform, which can subsequently be evaporated and do not impair the quality and usefulness of the egg white after the lysozyme has been removed therefrom.

The process according to the present invention has the advantage that lysozyme is obtained in high yields and with a high degree of purity, as can be shown by immunological tests against rabbit serum sensitised by egg white. Furthermore, the egg white remaining after the removal of the lysozyme is, in contradistinction to the previously described processes, not diluted, has not got an increased salt content and still contains substantially all of the original proteins since, apart from traces of other materials, only the lysozyme is adsorbed. Consequently, the egg white recovered can be used for a large variety of purposes. A further advantage of the process of the present invention is that the ion exchange resins can readily be regenerated and used again.

The ratio of egg white to ion exchange resin can obviously be varied within very wide limits but we have found that excellent results are obtained with the use of 1 ml. of ion exchange resin per 4 ml. of egg white, from which 10–20 mg. of lysozyme can be recovered.

It is to be understood that any suitable weakly acidic ion exchange resin can be used for carrying out the process according to the present invention, those containing carboxylic acid groups being preferred. Examples of ion exchange resins which can be used include "Amberlite CG-50" and "Amberlite IRC-50" (both methacrylic carboxylic acid resins obtainable from Rohm & Haas). ("Amberlite" is a registered trademark.)

For eluting the contaminating protein and lysozyme from the ion exchange resin, there can be used an aqueous solution of any water-soluble inorganic or organic salt. The same salt solution can be used for both elutions but, for economic reasons, it is preferable to use a more concentrated solution for eluting the lysozyme. As examples of inorganic salts, there may be mentioned sodium nitrate, potassium nitrate, ammonium nitrate, sodium chloride, potassium chloride, ammonium chloride, sodium carbonate, potassium carbonate, sodium bicarbonate, potassium bicarbonate, sodium sulphate, potassium sulphate, ammonium sulphate and the like, and as example of organic salts, there may be mentioned ethanolamine hydrochloride, mono-, di- and triethylamine hydrochloride, pyridine hydrochloride, sodium acetate, potassium acetate and the like.

The concentration of the salt solution used for eluting the lysozyme from the ion exchange resin is not critical, varying according to the salt used. However, it is to be understood that the concentration must not be so high as to cause precipitation of the lysozyme. Generally speaking, however, the concentration of the salt solution used is in inverse relationship to its pH value. Good results have been obtained with, for example, 6–10% solutions of ammonium sulphate, 2–3% solutions of sodium chloride, 7% solutions of triethylamine hydrochloride, 10% solutions of sodium acetate and 5% solutions of sodium carbonate or sodium bicarbonate.

The salt used for the precipitation of the lysozyme from the eluate can be, but is not necessarily, the same as the salt used for the elution. When two different salts are used, it is obviously only necessary that these are compatible with one another, i.e. do not react and themselves form a precipitate.

The lysozyme obtained by the process according to the present invention can be made up into forms suitable for oral or parenteral administration by admixture with suitable solid or liquid pharmaceutical carriers or diluents.

The following examples are given for the purpose of illustrating the present invention:

EXAMPLE 1

52 kg. of hens' egg white are contacted with 15 litres "Amberlite IRC-50," equilibrated to a pH of 6.5, at a temperature of 0–5° C. until the lysozyme content of the egg white is only 80–100 μg./ml.

The resin is then washed with water and thereafter with a 0.2 M sodium phosphate buffer of pH 6.5 until no more proteinaceous material is eluted, whereafter the lysozyme is eluted with an 8% solution of ammonium sulphate. Further ammonium sulphate is added to the eluate to increase the concentration to about 40%, whereby the lysozyme precipitates.

In order to obtain the chloride of the enzyme and to eliminate traces of impurities, the precipitate is dissolved in water, filtered to remove insoluble matter and the pH of the filtrate adjusted to 3.3 with hydrochloric acid. Lysozyme is then precipitated as the chloride by the addition of an aqueous solution of sodium chloride.

EXAMPLE 2

The process was carried out analogously to that described in Example 1. However, the ion exchange resin used is adjusted to a pH of 6.4–6.5 and, before elution of the lysozyme, the proteinaceous material is eluted with a 0.16 M phosphate buffer of pH 6.4–6.5. The lysozyme is eluted with a 10% w./v. solution of ammonium sulphate. The losses of lysozyme do not exceed 100–120 μg./cc. of egg white and the yield of lysozyme is 97–98% by weight. Further ammonium sulphate is added to the eluate to increase the concentration to about 40%, whereby the lysozyme precipitates.

In order to obtain the lysozyme base and to eliminate traces of impurities, the precipitate is dissolved in water to give an approximately 5% by weight solution. The pH is then adjusted to 10.5 and the solution is filtered. Ammonium chloride is added to the filtrate to give an approximately 20% w./v. solution. The lysozyme crystallises out quantitatively in microcrystalline form.

EXAMPLE 3

When the process of Example 2 is repeated but using 1–10% w./v. solutions of sodium sulphate, sodium chloride, ammonium chloride or sodium acetate for eluting the lysozyme from the ion exchange resin, equally good results are obtained.

EXAMPLE 4

The process of Example 2 is repeated but the lysozyme obtained is dissolved in water, the pH of the solution obtained is adjusted to 3.3(±0.3) with hydrochloric acid and then a 5% w./v. solution of sodium chloride is added. A precipitate of pure lysozyme is obtained.

We claim:
1. Process for the production of lysozyme from undiluted egg white, consisting essentially of contacting said egg white with a weakly acidic ion exchange resin at a pH of 6–7 at a temperature below room temperature, separating the resin, eluting contaminating proteins from the resin with a salt solution having a concentration of not more than 0.2 M and a pH of not more than 7, then eluting the lysozyme with an aqueous solution of a salt which has a higher concentration than the salt solution used for eluting contaminating proteins and precipitating the lysozyme from the eluate by increasing the salt concentration therein.

2. Process according to claim 1, wherein egg white is contacted with the exchange resin at a pH of 6.4–6.5.

3. Process according to claim 1, wherein the egg white is contacted with the exchange resin at a temperature of 0–5° C.

4. Process according to claim 1, wherein solutions of the same salt are used for eluting contaminating protein and for eluting lysozyme.

5. Process according to claim 1, wherein 1 ml. of exchange resin is used per 4 ml. of egg white.

References Cited

UNITED STATES PATENTS 3,419,471   12/1968   Matsuoka et al. _____ 195—66

OTHER REFERENCES

Jolles et al., Nature, vol. 208, pp. 1204–1205 (Dec. 18, 1965).

LIONEL M. SHAPIRO, Primary Examiner